United States Patent

Fentress

[11] 4,081,165
[45] Mar. 28, 1978

[54] MOUNTING ASSEMBLY

[76] Inventor: Gene Fentress, 1825 Oak Park Dr., North, Clearwater, Fla. 33516

[21] Appl. No.: 754,799

[22] Filed: Dec. 27, 1976

Related U.S. Application Data

[63] Continuation of Ser. No. 541,726, Jan. 17, 1975, abandoned.

[51] Int. Cl.² .............................................. A47B 96/06
[52] U.S. Cl. ................................................. 248/205 R
[58] Field of Search ........... 248/205 R, 205 A, 226 F, 248/499, 507, 508, 117.4, 117.6, 115; 24/17 B, 73 CF, 201 LP; 240/90, 52.1, 73 QD, 52.3, 52 R, 7.5, 57, 73 R; 403/353, 376, 377

[56] References Cited

U.S. PATENT DOCUMENTS

| | | | |
|---|---|---|---|
| 2,026,779 | 1/1936 | Faith et al. | 248/205 R |
| 2,570,933 | 10/1951 | Fobes et al. | 403/376 |
| 2,603,519 | 7/1952 | Sam | 403/376 |
| 2,974,965 | 3/1961 | Welles | 403/378 |
| 3,828,714 | 8/1974 | Perkins | 114/218 |

*Primary Examiner*—Robert Hafer
*Attorney, Agent, or Firm*—Duckworth, Hobby, Allen & Pettis

[57] ABSTRACT

A mounting assembly for removably mounting a device, such as a trailer light, upon a cleat-like fixture. The light or device being mounted is attached to a base which has an aperture formed therein and configured to correspond to and accept at least one prong of the supporting cleat. An elastic retainer, such as shock cord, is stretchably fitted over the other prong of the cleat. Further, in the event the cleat has a hollow center, a modification of the base of the device isl configured to fit over the cleat and has a pin which passes through the hollow portion to affix the device to the cleat.

4 Claims, 11 Drawing Figures

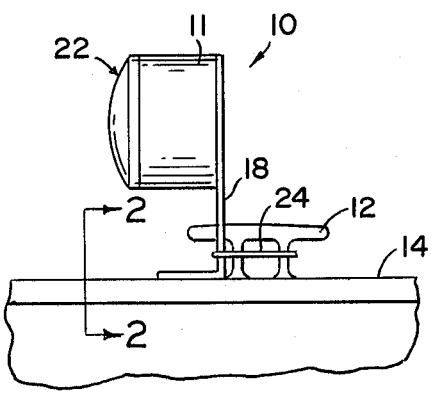
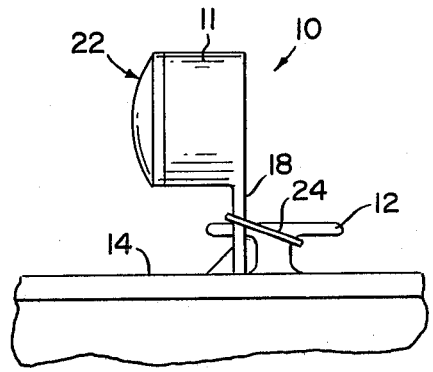
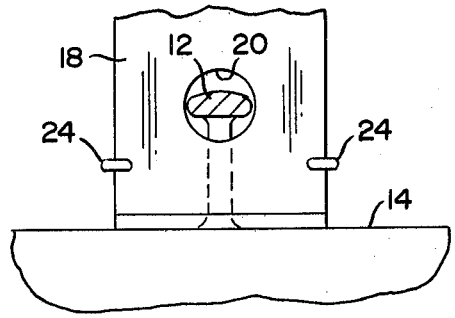
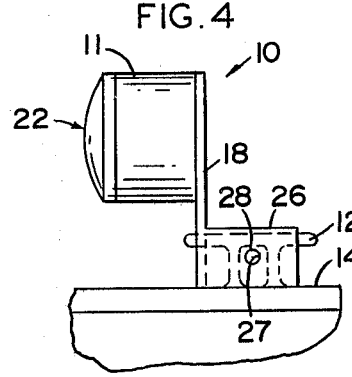
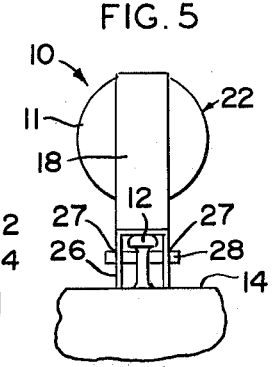
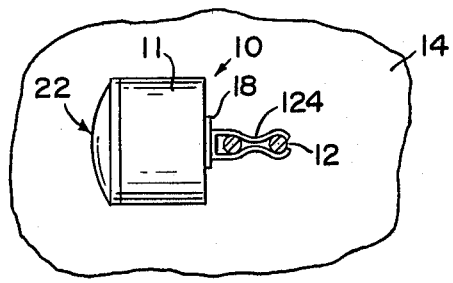
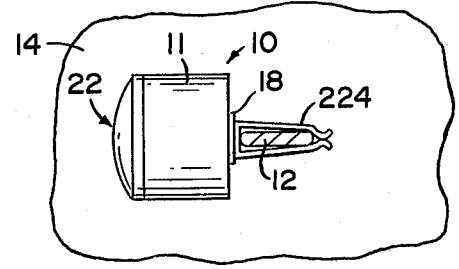
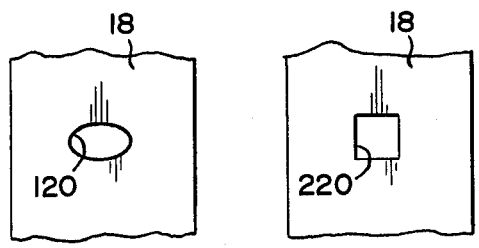

MOUNTING ASSEMBLY

This is a continuation of application Ser. No. 541,726 filed Jan. 17, 1975, now abandoned.

BACKGROUND OF THE INVENTION

1. Field of the Invention

A mounting assembly to permit the removable installation of various devices upon a permanent cleat-like fixture.

2. Description of the Prior Art

Mounting assemblies which enable various type devices to be removably mounted on a number of support bases are well known in the prior art. However, a number of these prior art mounting assemblies are generally designed for specific application and, accordingly, possess inherent defects which render them limited in use and objectionable because of the design and expense. Many removable mounting assemblies require a specially designed fitting permanently affixed to the surface upon which the device is to be mounted. This is generally considered a limiting assembly since the permanently attached fitting is usually of little or no use for other than mounting the certain specific device. Further, the permanent fitting, when the device is not attached to it, is frequently positioned in an interruptive position thereby further limiting the utility of the device.

Numerous mounting assemblies of the prior art are specifically designed so that the device to be mounted can only be used with the fixture designed for it. This precludes transferring the device from one place or another without the permanent installation of another specially designed fixture. Accordingly, it is frequently recognized that it is wasteful and expensive to require special permanent mounting fixtures which have no additional use and are limited to one specific application, or a specific category of applications.

With specific reference to a given application, many presently known mounting assemblies used for boat trailer lights are inefficient or difficult to use in several respects not discussed above. Primarily, trailer lights are affixed permanently to the trailer body. Upon launching or hauling of a boat, these are submerged and subject to the damaging effects of water. Also, the lights are exposed to being struck, broken or dislodged by persons during the launching or hauling of a boat and by collision during manipulation of a trailer which is attached to a vehicle.

Another serious problem encountered with lights mounted on a trailer is that when a boat is on the trailer, the stern frequently overhangs the rear portion of the trailer. Also, the drive portion of the propulsion and steering system will sometimes obscure the trailer lights from the view of a motorist following the boat and trailer.

Accordingly, it is readily seen that there is a need, particularly in the marine industry, for a mounting assembly for removably mounting a device such as a light structure on a trailer. The elimination of the above noted problems may be avoided by utilizing an already existing mounting fixture attached to the surface upon which the device is to be mounted. This already installed fixture could be a part of the boat or trailer, for example, and as such would be of use in a different capacity when the light or other device to be mounted is not stationed thereon.

SUMMARY OF THE INVENTION

The mounting assembly of the present invention is used for mounting lights or like devices and comprises at least two parts. The first part is a first fixture comprising a base and a light structure or like device attached to the base. The base is dimensioned and configured to be attached to a second fixture, such as a cleat on a boat. It should be emphasized that while the preferred embodiment of the present invention is depicted in structural terms of a light being attached to a boat cleat, any other device other than a light, could be adapted to the structure of the present invention. Accordingly, the base is designed for attachment to a cleat-like device which is generally seen in marine usage. The cleat is an object which has opposing prong-like protrusions. It is generally contemplated that a line can be wrapped around these prong-like protrusions. There may or may not be a hole in the cleat-like device, the center line of the hole being normal to the direction of the prong-like objects.

The base can be cooperatively fitted over the cleat or second fixture structure in such a manner that it is firmly attached thereto. The method of obtaining the firm attachment to the second fixture means is achieved in one of several possible ways. In one embodiment of the present invention, the base of the first fixture will have an aperture means including at least one aperture shaped to accept one of the prongs of the cleat-like device. The first fixture is then slidingly fitted onto one prong of the cleat-like device or second fixture structure which may be of similar form. The base further includes a support portion disposed in supporting engagement with a surface or like area on which the base is mounted. Accordingly, the aperture is formed in the base between the light device and the support portion of the base. A retaining means in the form of a cord is permanently affixed to the base substantially adjacent the aperture and is fitted over the opposite prong of the cleat. This retaining cord is of an elastic material such that it will stretch and fit over the prong of the cleat in biased relation to the base. The retaining means will then snugly retain the base of the first fixture of the cleat.

Another embodiment of the present invention contemplates the cleat-like device having an aperture in its base, it is envisioned that the base of the first fixture means will slide over the prong of the cleat-like device. The retaining means is in the form of a pin affixed to the base which will be inserted through the hole in the cleat. This will serve to affix the first fixture to the cleat-like device. Attachment may also be achieved by having a retaining means in the form of a spring retaining clip which fits over the base of the cleat-like device.

The invention is extremely simple and easy to mount. The base can be attached to the cleat-like device with ease and rapidity and affords a firm mounting system for a device affixed to the base of the first fixture.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a side view of the mounting assembly of the present invention with a retainer means in the form of an elastic cord.

FIG. 2 is a partial, sectional front view of the embodiment of FIG. 1 as shown along line 2—2 thereof.

FIG. 3 is a side view of the device mounting system with an alternate embodiment of a retainer means.

FIG. 4 is a side view of yet another embodiment of the present invention with a modification of the retainer means.

FIG. 5 is an end view of the embodiment of FIG. 4.

FIG. 6 is a top view of yet another embodiment of the mounting assembly showing a modified retainer means.

FIG. 7 is a top view of the mounting assembly showing an alternate configuration of the retainer means.

FIG. 8 is a front view of an aperture means.

FIGS. 9-11 are all front views of alternate embodiments of aperture means in the base of the present invention.

Similar reference characters refer to similar parts throughout the several views of the drawings.

DETAILED DESCRIPTION

The mounting assembly is generally indicated as 10 in FIG. 1 and comprises a first fixture means 11 attached to a supporting second fixture means 12, as will be explained in detail hereinafter. First fixture means 11 comprises base means 18, retainer means 24 attached to base means 18 and device means 22 which may be in the form of a light or like structure mounted onto base means 18. In base means 18 there is aperture means 20 which, as shown, is disposed and configured to engage the second fixture means 12.

Second fixture means 12 comprises a cleat-like device typically found in, but not necessarily limited to, marine usage. This cleat-like device generally has two opposing prongs raised above a support surface on pedestal-like stands which are permanently mounted to the support surface. The cleat-like device 12 may be of conventional structure or can assume various configurations commonly available. Some may have a hollow base, some will have a solid base, and the prongs can be of any number of shapes and configurations. However, the mounting assembly 10 and, more specifically, base 18 is designed to be mountable on a wide range of cleat-like devices having substantially equivalent configurations.

FIG. 2 is a front view of FIG. 1 along line 2—2 showing aperture means 20 located in base means 18 and the prong of second fixture means 12 removably positioned in aperature means 20. Also shown is retainer means 24. In the embodiment shown in FIGS. 1, 2 and 3, retainer means 24 comprises an elastic cord attached to base 18 and disposed to be positioned in at least partially surrounding relation to cleat 12. By virtue of this structure, the base 18 and the light attached thereto is removably mounted on a cleat or on a second fixture 12.

FIG. 3 shows mounting assembly 10 with another embodiment of base means 18 of first fixture means 11. In this embodiment, retainer means 24 comprises the elastic cord but its disposition is at least in part above aperture means 20 formed in base means 18 as shown.

As best shown in FIGS. 1-4, the base means 18 may further include a support portion 15 disposed in supporting relation to the rest of the base means 18 and in engaging relation to a surface wall member 14 on which the mounting assembly is positioned.

FIG. 4 is a side view of device mounting system 10 showing portion 18 with substantially inverted U-shaped base means 26 attached thereto. Within the walls of substantially inverted U-shaped portion 26 are at least one connecting hole means 27. A pin or like connector 28 passes between connector hole means 27. This mounting assembly is used when second fixture means 12 has an aperture in the base as shown in FIG. 4. Thus, pin connector 28 passes between hole means 27, connector pin 28 passes through the cleat-like device and the first fixture means is fixedly retained to second fixture means 12. It is contemplated that pin means 28 be tapered so as to establish a press fit within hole means 27. It is also contemplated in another embodiment that pin means 28 comprise a spring loaded plunger means to fit in hole means 27. Another possible configuration would be to have hole means 27 threaded and pin means cooperatively threaded so that a screw-threaded fit can be established. FIG. 5 is an end view of device mounting system 10 with the substantially U-shaped inverted base means 26.

Another means of retaining first fixture means 11 upon second fixture means 12 is detailed in FIG. 6 and FIG. 7. FIG. 6 shows a cross-section of cleat-like device means 12 with retainer means 124 pressingly attached thereto. Retainer means 124 is affixed to base means 18. To attach first fixture means 11 to second fixture means 12, retainer means 124 is slidingly fitted over the lower portion of second fixture means 12. Retainer means 124 is constructed of a material such as spring steel or the like which tightly grasps the lower portion of second fixture means 12. First fixture means 11 is thus sturdily mounted to second fixture means 12. FIG. 7 details retainer means 224 springingly compressed about the base of second fixture means 12. In this configuration, the base of second fixture means 12 is solid. Again, spring retainer means 224 is permanently affixed to base means 18 of first fixture means 11. Retainer means 224 is slidingly fitted onto the base of second fixture means 12 and the tension of the material from which retainer means 224 is constructed holds first fixture means 11 firmly to second fixture means 12.

It is contemplated that aperture means 20 located in base means 18 of first fixture means 11 can comprise a variety of shapes in order to conform to the shape of the prong of the cleat-like device 12. FIGS. 8-11, inclusive, showing aperture means 120, 220, 320 and 420, respectively, detail configurations for aperture means 20 which would accept a number of various profiles of the prong of second fixture means 12.

While the mounting assembly of the present invention is specifically described with reference to a light element 22, it should be pointed out that the mounting assembly could also be utilized in combination with any predetermined element other than a specific light member 22.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A mounting assembly for connecting a predetermined element on a supporting fixture, said mounting assembly comprising: a first fixture means including a base means, said predetermined element connected to said base means; said base means comprising a support portion formed thereon and disposed in engaging, substantially supported relation to a supporting surface on which said base means is mounted, at least one side of said support portion disposed in adjacent relationship to the supporting surface on which said base means is mounted; said mounting assembly further comprising retainer means comprising an elastic, elongated member mounted on said base means between said support portion and said predetermined element; aperture means formed in said base means substantially adjacent said retainer means between said predetermined element and said support portion, said elastic member connected to said base means along oppositely disposed edges of said base means and on substantially opposite sides of said aperture means, said aperture means being disposed and correspondingly configured for surrounding disposition relative to the supporting fixture, said elastic member disposed to be extendable away from said base means and in surrounding relation to the supporting fixture, whereby both said aperture means and said elastic member are concurrently disposed in surrounding relation to various parts of the supporting fixture.

2. A mounting assembly as in claim 1 wherein said support portion is defined by one end portion of said base means oppositely disposed on said base means relative to said predetermined element and extending outwardly from the longitudinal axis of said base means.

3. A mounting assembly as in claim 1 wherein said retainer means is connected to said base means adjacent said aperture means and between said aperture means and said predetermined element.

4. A mounting assembly as in claim 1 wherein said retainer means is connected to said base means adjacent said aperture means and between said aperture means and said support portion.

* * * * *